United States Patent [19]
Zhao et al.

[11] Patent Number: 5,948,152
[45] Date of Patent: Sep. 7, 1999

[54] HOMOGENEOUS LIQUID COMPLEXES OF ANIONIC ORGANIC DYES AND QUATERNARY AMMONIUM COMPOUNDS AND METHODS OF COLORING UTILIZING SUCH COMPLEXES

[75] Inventors: Xiaodong Edward Zhao, Moore, S.C.; Kaye Cannon Suddeth, Lynn, N.C.; Patrick D. Moore, Pacolet; Raj Batlaw, Spartanburg, both of S.C.

[73] Assignee: Milliken & Company, Spartanburg, S.C.

[21] Appl. No.: 09/065,597

[22] Filed: Apr. 24, 1998

[51] Int. Cl.$^6$ .......................... C09D 11/00; C09B 67/54
[52] U.S. Cl. ...................... 106/31.43; 106/31.64; 106/272; 8/606; 8/557; 524/583; 524/585; 524/590; 524/601
[58] Field of Search .................. 8/547, 543, 524, 8/606, 557; 510/181, 205; 106/37.15, 18.29, 31.64, 31.43, 31.27, 31.49, 272; 524/583, 585, 590, 601

[56] References Cited

U.S. PATENT DOCUMENTS

| | | | |
|---|---|---|---|
| 4,369,041 | 1/1983 | Dvorsky et al. | 8/532 |
| 4,459,130 | 7/1984 | Helling et al. | 8/554 |
| 4,507,407 | 3/1985 | Kluger et al. | 521/113 |
| 4,563,190 | 1/1986 | Töpfl | 8/524 |
| 4,640,690 | 2/1987 | Baumgartner et al. | 8/506 |
| 4,648,883 | 3/1987 | Podder | 8/527 |
| 4,702,744 | 10/1987 | Wolff et al. | 8/527 |
| 5,059,244 | 10/1991 | King et al. | 106/21 |
| 5,096,458 | 3/1992 | Michna et al. | |
| 5,096,781 | 3/1992 | Vieira et al. | |
| 5,250,107 | 10/1993 | Bares | 106/20 R |
| 5,266,077 | 11/1993 | Auten et al. | 8/507 |
| 5,356,441 | 10/1994 | Tokieda et al. | 8/543 |
| 5,403,358 | 4/1995 | Aston et al. | 8/445 |
| 5,534,192 | 7/1996 | Incorvia et al. | |
| 5,624,484 | 4/1997 | Takahashi et al. | |
| 5,835,116 | 11/1998 | Sato et al. | |

*Primary Examiner*—Deborah Jones
*Assistant Examiner*—Jason Savage
*Attorney, Agent, or Firm*—Terry T. Moyer; William S. Parks

[57] ABSTRACT

This invention relates to liquid complexes of anionic organic dyes with quaternary ammonium compounds which are homogeneous and thus substantially free of unwanted inorganic salts. Of particular interest as quaternary ammonium compounds are those which comprise alkoxylated moieties. Such complexes are formed through ionic bonds formed between the two compounds. The complexes are then removed of substantially all resultant unwanted salt formed from the cations of the dye and the counter ions of the quat so as to obtain an homogeneous liquid colorant which easily disperses within different media and which possess favorable migration and coloring characteristics. This invention also concerns methods of making the aforementioned salt-free anionic dye/quat complexes as well as methods of utilizing such complexes for dyeing thermoplastic and thermoset compositions and the incorporation of such complexes within aqueous and non-aqueous formulations and ink compositions.

20 Claims, No Drawings

HOMOGENEOUS LIQUID COMPLEXES OF ANIONIC ORGANIC DYES AND QUATERNARY AMMONIUM COMPOUNDS AND METHODS OF COLORING UTILIZING SUCH COMPLEXES

FIELD OF THE INVENTION

This invention relates to liquid complexes of anionic organic dyes with quaternary ammonium compounds which are homogeneous and thus substantially free of unwanted salts. Of particular interest as quaternary ammonium compounds are those which comprise alkoxylated moieties. Such complexes are formed through ionic bonds formed between the two compounds. The complexes are then removed of substantially all resultant unwanted salt formed from the cations of the dye and the counter ions of the quat so as to obtain an homogeneous liquid colorant which easily disperses within different media and which possess favorable migration and coloring characteristics. This invention also concerns methods of making the aforementioned salt-free anionic dye/quat complexes as well as methods of utilizing such complexes for dyeing thermoplastic and thermoset compositions and the incorporation of such complexes within aqueous and non-aqueous formulations and ink compositions.

BACKGROUND OF THE PRIOR ART

All of the patents cited throughout this specification are hereby entirely incorporated herein.

Quaternary ammonium compounds are well known as complexing agents for anionic dyes. For example, U.S. Pat. No. 5,059,244, to King, discloses an aqueous solution of anionic dyes and an ethoxylated triethanolamine. This composition is useful as an ingredient within ink formulations and as an agent for temporarily tinting textile fibers; however, patentee neither teaches nor suggests removing any excess inorganic salts from the resultant colorant composition. Quaternary ammonium compounds have been disclosed as useful auxiliary agents for printing on fiber materials. For example, U.S. Pat. No. 3,785,767, to Hildebrand, discloses a pad-steaming process for the continuous dyeing and printing of fiber material with a formulation containing anionic dyes and amine salts. Other pertinent teachings of include U.S. Pat. No. 4,563,190, to Topfl, which discloses a dyeing assistant formulation for anionic dyes containing quaternary ammonium compounds that contain at least one basic nitrogen atom to which are attached at least one polyglycol ether chain; U.S. Pat. No. 4,935,033, to Mosimann et al., which discloses a dyeing method for natural polyamide fibers using reactive dyes and a dyeing assistant agent containing a quaternary ammonium compound; and U.S. Pat. No. 4,369,041, to Dvorsky et al., discloses a technique for printing textiles involving exposing the textile to the action of quaternary ammonium compounds before or during the dyeing or printing with acid dyes. Furthermore, Aston et al., U.S. Pat. No. 5,403,358, discloses a pretreatment composition for ink jet which comprises a quaternary ammonium compound and a reactive dye. Such anionic dyes and quaternary ammonium compounds also find application in other areas, for instance: U.S. Pat. No. 4,459,130, to Helling et al., discloses a dye preparation which is consisted of an acid dye and a basic carrier which contains quaternary ammonium or phosphonium groups; and U.S. Pat. No. 5,266,077, to Auten et al., discloses a method for tinting a hydrophilic contact lens through the action of a quaternary ammonium compound as a dye complexing agent. The closest prior art is taught within U.S. Pat. No. 4,648,883, to Podder. Patentee discloses printing ink compositions comprising colorants which are products of the reaction of anionic dyes and quat-containing, polystyrene ion exchange columns. The resultant product is removed of excess inorganic salt, and separated and ground into particles for subsequent dissolution within certain solvents. Podder's compounds, although they are inorganic salt-free, must include the high molecular weight cross-linked polystyrene ion exchange component. Thus, all of patentee's possible colorants must be solids when purified and undiluted with solvent.

Anionic dyes, in particular acid dyes (i.e., those containing sulfonic or carboxylic acid moieties) provide desirable and beneficial coloring characteristics to many different types of substrates. However, it has proven very difficult to incorporate such beneficial dyes, with acceptable coloring performance, within certain media, such as waxes, polyolefins, polyurethanes, hydrocarbons, and the like. The polarity (hydrophilicity) of such acid dyes is sufficiently high so as to prevent long-lasting dyeing or even any coloring at all within such media. Attempts have been made to utilize more hydrophobic solvent dyes (and other less polar dyes having no acid groups) as colorants for thermoplastics, and the like; however, such a procedure has also proven disadvantageous since hydrophobic solvent dyes which easily migrate within and out of the aforementioned desired media. There exists a need then to produce an inexpensive colorant which possesses the requisite degree of hydrophobicity effectively to bond with and remain within media such as thermoplastics and the like (as noted above).

It has been found that the complexation of an anionic dye with a quaternary ammonium compound and the subsequent removal of substantially all the excess unwanted salt formed during such a reaction produces an homogeneous colorant which possesses the highly desired and necessary properties as delineated previously. Therefore, it has been found that such homogeneous anionic dye/quaternary ammonium colorant complexes, and in particular those complexes which are, in an undiluted state, liquid below a temperature of about 100° C. (at ambient pressure of from about 0.8 to about 1.2 atmospheres) provide colorant with a high coloring capacity within many different media with a very low potential for extraction. When placed in a complexing solution, the anionic dye and the quaternary ammonium show a great affinity for one another such that upon disassociation with their respective cations and/or counter ions, the complexation of the dye and quat drives the formation of unwanted salts comprised of the free cations and counter ions. Once these unwanted salts are formed, they are easy to remove through filtration, phase separation, or extraction techniques. Such a salt removal, and thus creation of an homogeneous liquid colorant complex, ensures the dye and quat will remain in such a complex together rather than potentially reacting with unwanted free cations and/or counter ions upon disassociation within the dye solution. Thus, the desired properties are obtained with a greater amount of the dye/quat complex and a much lower amount of unwanted residual salt.

Although a great deal of interest has been demonstrated within the area of anionic organic dyes and/or quaternary ammonium compounds as coloring or treating agents for myriad substrates, there is no disclosure of an homogeneous (substantially cation/counter-ion salt-free) complex, which is liquid at a temperature of at most 100° C. in its pure, undiluted state, of the two compounds which provides extremely good non-migration, excellent coloring characteristics, and the like, within certain media. There is a great need within the dye and/or colorant art for such types of improvements associated with relatively inexpensive materials and processes which are provided by the inventive colorant complexes.

OBJECTS OF THE INVENTION

It is therefore an object of this invention to provide an homogeneous complex of anionic dyes and quaternary ammonium compounds which is liquid in its pure, undiluted state, as colorants for different substrates and media, and which is substantially free from unwanted salts. A further objective of this invention is to provide a polymeric colorant which can be used in dyeing aqueous compositions, organic formulations, thermoplastics, thermosets, and waxes, as well as within ink-jet and printing ink formulations and applications.

SUMMARY OF THE INVENTION

The technique of forming complexes between anionic dyes and quaternary ammonium compounds is known within the prior art. However, homogeneous liquid anionic dye/quat colorant complexes and, more importantly, the advantages and applications of such liquid complexes have heretofore been unexplored. The inventive colorant complexes are those which produce color in the visible spectrum and are liquid in their undiluted states at a temperature of at most about 100° C.; preferably at most about 80° C.; more preferably at most about 65°; and most preferably at most about 50° C. The inventive colorant complexes are those which produce colors within the visible spectrum and thus specifically do not include optical brighteners, ultra violet absorbers, and the like.

The previously taught anionic dyes/quaternary ammonium compound complexes are typically not purified and contain large amounts (generally from about 1 to about 50%) of unwanted cation/counter-ion salts. Such salts may be strictly inorganic in nature or may comprise organic cations or organic counter-ions as well. Some salts are typically present within acid dye compositions as byproducts from manufacturing processes as well as diluents which provide the capability to level the color strength. Typical inorganic salts are sodium sulfate and sodium chloride, however many other different salts, including organic salts, as noted above, may also be present. As discussed in greater detail below, such unwanted salts are also byproducts from the complexation between anionic dyes and quaternary ammonium compounds. With the presence of such unwanted salts in the composition, either the quaternary ammonium compounds or the cations may serve as counter ions for the complexed anionic dyes. As a result, the chances for continued complexation between the dye and quat components decreases with the presence of increased amounts of inorganic salts. Since the dye and quat compounds will disassociate in solution, some free acid dye will inevitably bond to free cations and some free quat will inevitably bond with free counter ions, thereby lowering the overall coloring and nonmigratory effect of the dye/quat complex. This deleterious effect is thus more pronounced upon greater amounts of residual unwanted salt. Thus, salt-containing heterogeneous acid dye/quat complex colorant systems show uneven solubility and poor dispersability in different organic media, such as plastics, waxes, coating systems, and organic solvents. Such complexes are therefore neither suitable as dyes or colorants for thermoplastics, thermosets, or waxes, nor as colorants within ink-jet and printing applications and formulations. Therefore, the term "homogeneous" as used in the context of this invention is primarily intended to mean a complex which is substantially free from these unwanted cation/counter-ion salts.

It has been discovered that an homogeneous anionic organic dye/quaternary ammonium complex colorant, which is liquid in its undiluted state at a temperature of at most about 100° C., provides favorable non-migration and coloring characteristics within thermoplastics, thermosets, and waxes, as well as within ink-jet and printing applications and formulations. The removal of unwanted salts provides an improved stability for the complexes. Such a homogeneous complex has excellent dispersability and solubility in plastics, water, organic solvents, and coating systems. Furthermore, the physical properties of the complex can be tailored to any particular requirement by altering the structure of the quaternary ammonium compound. For instance, a more hydrophobic quaternary ammonium structure, such as with an ethoxylated alkylquat or tetraalkyl quats, affords the user, upon complexation with an anionic dye and removal of substantially all of the resultant salt, a colorant which is suitable for coloring solvent systems, waxes, plastics, such as polyolefins, polyurethanes, and polyesters, as merely examples, and printing inks.

The term "solvent systems" encompasses any aqueous or organic liquid formulation. Non-limiting examples of the intended aqueous systems include cleaning solutions, detergents, fabric softeners, marking inks and colorants, and keratin dyes. Non-limiting examples of organic formulations include the non-aqueous types of cleaning solutions, detergents, fabric softeners, marking inks and colorants, keratin dyes, as well as descalers, surfactant formulations, hydrocarbon compositions, and the like.

The term "waxes" includes any solid or semi-solid fatty-chain compounds. Such compounds are commonly incorporated within, as merely examples, candles, car-body and furniture treatment compositions, ear plugs, and the like.

Plastics, both thermoplastics and thermosets, are typically dyed by adding a pigment or dyestuff to the resins. The incorporation of pigments into plastics might adversely impact the physical properties of plastics. If a conventional dyestuff is employed, water resistance, oil resistance and the migration of the dyestuff may often be disadvantageously inadequate. One definite improvement in coloration of plastics is set forth in U.S. Pat. Nos. 4,640,690, to Baumgartner et al., and 4,507,407, to Kluger et al., in which liquid polymeric colorants are added to the resin before or during compounding and polymeric addition reaction. These patents also provide the same definition and scope of the terms "thermoplastics" and "thermosets" as for the inventive coloring applications. The polymeric colorants disclosed in these references may be broadly described as polyalkyleneoxy-substituted chromophore groups. Colorants of this general class are well known and have been disclosed as fugitive tints in U.S. Pat. No. 3,156,663 to Kuhn, as merely one example. Even through the polymeric colorant represents a vast improvement over prior arts, the actual number of chromophores which can be adapted to this technique is limited due to the lack of available polymeric intermediates.

Printing inks include compositions utilized as colorants within, again, as merely examples, pens, including, but not limited to ball-point and fountain pens, dot-matrix printers, toners for standard copy machines, ink-jet applications, permanent markers, dry-erase markers, newsprint, magazine print, laser jet printers, and the like.

The inventive complexes possess the advantageous properties of polymeric colorants such as high tint strength, desirable migratory properties, and minimal impact on the physical properties of plastics. Also, as with polymeric colorants disclosed within the prior art, the complexes described in this invention may be present, if desired, in a neat liquid state at ambient pressure and temperature (or below a temperature below about 100° C.). However, unlike the polymeric colorant technology noted above, virtually all types and classes of chromophores can be adopted to practice this invention. Furthermore, the inventive colorant complexes exhibit excellent jettability and waterfastness characteristics in water-based ink jet applications and good solubility within water and toluene printing ink diluents.

A wide range of anionic dyes, such as acid dyes, direct dyes and certain food dyes, from yellow to cyan, are useful within the inventive homogeneous complexes. Such chromophore molecules, however, must have at least one sulfonic or carboxylic acid functionality in order to form the necessary complex with the quaternary ammonium compound. The cationic ammonium group bonds with such acid (i.e., sulfonic and/or carboxylic) groups so as to form ionic bonds. It is not fully understood how the interaction between the cationic moiety of the quaternary ammonium and the anionic moieties of the anionic dyes is accomplished; however, it is evident that the quaternary ammonium compound has a greater affinity for the anionic dye rather than for the anionic counter ion to which such quats are generally bonded. The same holds true for the anionic dye which has more of an affinity for the cationic quat rather than for the cationic counter ion. Upon complexation, then, the free counter ions of both components react together to form the aforementioned unwanted salts which require removal (at least to a substantial extent) from the resultant complex in order to provide the desired homogeneous colorant having the aforementioned beneficial properties. The permissible level of remaining unwanted salt, and thus the upper level permitted under the definition of "homogeneous" for this invention, is, at most, about 5,000 ppm. In theory, it is impossible to remove all of the inorganic salt from such complexes; however, at such low, permissible, and attainable levels of salt content, the desired migration and colorant characteristics may be obtained. Certainly, a level of no salt at all would be most preferred in order to produce a true homogeneous complex; however, such a level is, as noted above, nearly impossible to achieve. Therefore, it is necessary to provide an upper level of unwanted residual salt which is acceptable within the inventive homogeneous colorant complex. Additionally, the term "homogeneous" also denotes a colorant complex which is in one complete physical state throughout, such as totally present as a liquid rather than a liquid comprising particulates.

A wide range of quaternary ammonium compounds have been shown to be useful for practicing the invention. A broad list of potentially useful quats within this invention include trialkyl, dialkyl, dialkoxy alkyl, monoalkoxy, benzyl, and imidazolinium quaternary ammonium compounds. The particularly preferred quats are noted below as this is merely a broad list of different classes of quaternary ammonium compounds which may be useful within the inventive complex and method.

Basically, then, the simplest manner of practicing the invention is first determine the desired anionic dye for its shade, lightfastness, thermal stability, and the like, for the subject substrate to be colored; second, select the appropriate quaternary ammonium compound for the subject substrate based on the necessarily required physical properties such as migration, uniform dispersion, solubility, washfastness, and the like; third, react the two compounds together to form a liquid complex; and last, remove the unwanted salts formed from the cation of the dye and the counter-ion of the quat.

DESCRIPTION OF THE PREFERRED EMBODIMENT

Without limiting the scope of the invention, the preferred features of the invention are exemplified below. Chromophores containing at least one sulfonic acid or carboxylic acid functionality are preferred and are most suitable within this invention. The acid functionality may be directly coupled to the chromophore or to a substituent on the chromophore. Examples of suitable chromophores are acid dyes and direct dyes. By ways of example, and not limitation, a list of preferred dyes is set forth in TABLE 1 below:

TABLE 1

| Dye | Class | C. I. number |
|---|---|---|
| Acid yellow 11 | Azo | 18820 |
| Acid yellow 17 | Azo | 42650 |
| Acid yellow 23 | Azo | 19140 |
| Acid yellow 25 | Azo | 18835 |
| Acid yellow 40 | Azo | 18950 |
| Acid yellow 3 | Quinoline | 47005 |
| Direct yellow 4 | Disazo | 24890 |
| Direct yellow 11 | Stilbene | 40000 |
| Direct yellow 44 | Disazo | 29000 |
| Acid orange 7 | Azo | 17925 |
| Acid orange 24 | Disazo | 20170 |
| Direct orange 15 | Stilbene | 40002 |
| Direct orange 39 | Stilbene | 40215 |
| Acid violet 7 | Azo | 18055 |
| Acid violet 19 | Triphenylmethane | 42685 |
| Acid violet 47 | Anthraquinone | * |
| Direct Violet 9 | Disazo | 27885 |
| Acid red 1 | Azo | 18050 |
| Acid red 4 | Azo | 14710 |
| Acid red 52 | Xanthene | 45100 |
| Acid red 87 | Xanthene | 45380 |
| Acid blue 127 | Anthraquinone | 62055 |
| Acid blue 9 | Triphenylmethane | 42090 |
| Acid black 1 | Disazo | 20470 |
| Acid black 2 | Azine | 50420 |
| Direct blue 86 | Phthalocyanine | 74180 |
| Direct blue 80 | Trisazo | 34200 |
| Direct blue 199 | Phthalocyanine | * |
| Direct black 22 | Polyazo | 35435 |
| Direct black 80 | Trisazo | 31600 |

*There are no Colour Index Numbers for these dyes.

Various types of quaternary ammonium compounds can be adapted to the invention herein with success. The quaternary ammonium compounds are analogs of ammonium salts in which organic radicals have been substituted for all four hydrogens of the original ammonium cation. Substituents maybe alkyl, aryl, aralkyl, or alkoxylates, or the nitrogen may be part of a ring system. By ways of example, and not limitation, a list of preferred classes and examples of quaternary ammonium compounds is set forth in TABLE 2 below:

TABLE 2

| Class | Example (description) |
|---|---|
| Trialkyl quats | Methyl tri(hydrogenated tallow) ammonium chloride |
| Dialkyl quats | Dicoco dimethyl ammonium chloride |
| Dialkoxy alkyl quats | Methyl bis(polyethoxyethanol) coco ammonium chloride |
| Monoalkoxy quats | Methyl (polypropylene glycol) diethyl ammonium chloride |
| Benzyl quats | Dimethyl tallow benzyl ammonium chloride |
| imidazolinium quats | Methyl tallow amido-2-tallow imidazolinium methylsulfate |

Again, the examples listed above are merely preferred compounds as any such compound meeting the broadly listed classes of quats are within the scope of this invention. Further suitable quats worth mentioning, however, include tetraalkyl quats, mono-substituted polyalkoxyalkyl quats, di-substituted polyalkoxyalkyl quats, and tri-substituted polyalkoxyalkyl quats, again merely as examples. Additionally, the most preferred quats will comprise 15 moles per alcohol chain of ethylene oxide moieties as such quats provide great versatility in coloring various substrates and are easy to handle. The amount of residual inorganic salts is generally between about 50 ppb and 5000 ppm. Typically sodium counter ions, and thus sodium salts, are the residual inorganic ions and salts within such anionic dyes. Monitoring of the inorganic salt level is available through conveniently and easily performed measurements of the sodium ion level within the composition.

Various purification techniques may be performed in order to remove substantially all of the residual inorganic salts from the complexes. Such techniques include, but are not limited to, solvent extraction, phase separation, ultrafiltration, and other filtration methods. Particularly preferred are ultrafiltration under high pressure, phase separation through the utilization of an ammonium carbonate rinsing procedure (i.e., three consecutive washings with 25% aqueous ammonium carbonate in a 1:1 weight ratio to complex), and solvent extraction filtration through the utilization of methylene chloride, chloroform, or the like. After the removal of excess inorganic salt, the resultant solution should also be stripped of excess water in order to purify the colorant complex. The inventive complexes will always form a liquid upon purification at a temperature below about 100° C.

The invention may be further understood by reference to the following non-limiting EXAMPLEs of the preferred embodiments of this invention. Comparative tests and samples are indicated as such.

Production of the Inventive Complex

EXAMPLE 1

Four hundred fourteen grams of direct blue 86 (0.342 mol), six hundred twenty-two grams of methyl bis [polyethoxy (15) ethanol] coco ammonium chloride (0.683 mol, trade name Variquat® K1215) were dissolved in one liter of water. The solution was stirred for 2 hours. The complex was purified through ultrafiltration. The ultrafiltration process was monitored by monitoring the sodium level of the solution. When the sodium level (adjusted to 100% solid) is lower than 1000 ppm by weight, the solution was stripped under reduced pressure at 90° C. to produce homogenous dark blue liquid. Upon cooling to 25° C. at 1 atmosphere of pressure, the resultant complex remained in liquid state.

A small amount of the resultant blue liquid was then placed between two microscope slides to test for uniformity of color. The liquid was evenly spread out upon placement of the upper slide and the slides were then viewed under a microscope at 10× power. This sample was homogenous and even amounts of color were uniformly distributed throughout the viewed slides. No phase separation or foreign substances (particles, for instance) were observed.

EXAMPLE 2

One hundred twenty six grams of direct blue 86, two hundred twenty grams of methyl (polypropylene glycol) diethyl ammonium chloride (trade name Emcol™ CC-9) were dissolved in one liter of water. The mixture was stirred for 2 hours. The solution was then extracted with 500 milliliters of methylene chloride. The methylene chloride solution was stripped under reduced pressure. An anhydrous flowable dark blue liquid was produced which remained in a liquid state at room temperature and pressure.

Further inventive anionic dye and quaternary ammonium compound complexes were prepared following the general procedure of EXAMPLEs 1 and 2, above. The Physical Form for each EXAMPLE was performed empirically at 25° C. and at 1 atmosphere pressure.

TABLE 3

| Ex. # | Dyes | Quaternary compounds | Physical Form | Color Value* (in Methanol) |
|---|---|---|---|---|
| 3 | Acid red 52 | Variquat ® K1215 | Liquid | 44 |
| 4 | Acid yellow 17 | Variquat ® K1215 | Liquid | 12.5 |
| 5 | Quinoline yellow S | Variquat ® K1215 | Liquid | 18.2 |
| 6 | quinoline yellow s | Emcol ™ CC-9 | Liquid | 24.2 |
| 7 | Acid yellow 23 | Variquat ® K1215 | Liquid | 11.2 |
| 8 | Amido black 10B | Variquat ® K1215 | Thick liquid | # |
| 9 | Nigrosin, water soluble | Variquat ® K1215 | Thick Liquid | # |
| 10 | Direct violet 9 | Variquat ® K1215 | Liquid | 24.5 |
| 11 | Acid red 52 | Emcol ™ CC-9 | Liquid | 55.3 |
| 12 | Acid blue 9 | Emcol ™ CC-9 | Liquid | 55.7 |

*Absorbance of 1.00 g/l solution at lambda max.
Due to the broadness of the peaks of these black dyes, no color values could be measured.

For comparative purposes, the following complexes were made without further purification of the complexes.

EXAMPLE 13 (COMPARATIVE)

Four hundred fourteen grams of direct blue 86, six hundred twenty-two grams of methyl bis[polyethoxy (15) ethanol] coco ammonium chloride were dissolved in one liter of water. The solution was stirred for 2 hours. Without further purification, water was stripped at reduced pressure at 90° C. to dryness. An anhydrous dark blue mixture with solid particles suspending in the dark blue liquid was obtained. The sodium level is measured as 55,000 ppm. This colorant correlates to EXAMPLE 1, above.

Upon the same slide test as performed in EXAMPLE 1, above, the resultant colorant proved to be highly heterogenous throughout with large amount of blue particulates suspended within the blue liquid.

EXAMPLES 14 and 15 (COMPARATIVE)

Further comparative anionic dye and quaternary ammonium compounds complexes correlating to the dyes and quats used in EXAMPLEs 3 and 5, above were prepared using the general procedure followed in EXAMPLE 13, above. No color values could be measured for these comparative colorants. The Physical Form was again measured at 25° C. and at 1 atmosphere pressure.

TABLE 4

(Comparative Colorants)

| Ex. # | Dyes | Quat compounds | Physical form |
| --- | --- | --- | --- |
| 14 | Acid red 52 | Variquat ™ K1215 | Liquid with Solid Particulate |
| 15 | Quinoline yellows | Variquat ™ K1215 | Liquid with Solid Particulate |

There is already a noticeable difference between the purified, substantially salt-free complexes and the non-purified complexes in their physical forms. Further testing of the characteristics of the two types of dyes were performed within thermoplastic (polyolefin) resins and within polyurethane foams. The results are outlined as follows:

Polyolefin Coloration Tests

Certain test examples were then introduced within thermoplastics (polyolefins) for testing. The typical color loadings are 500 and 1000 ppm by weight. The proper weight of the colorants to be tested was added to 1000 g of Fina 7525 polypropylene random copolymer pallets. The mixture was then tumbled for 20 minutes to ensure uniform colorant distribution over the surface of the pallets. The color pallets was then injection molded at 425° F. into 3 inch by 2 inch plaques with bi-level thickness of 50 mils and 85 mils. Each plaque was examined for color uniformity and discoloration, both are important commercial attributes. Plaques that show no color specks and no color deterioration were graded as "pass", while plaques that show color specks and color loss were graded as "fail" as presented in tabulated form below:

TABLE 5

| Colorant of example # | Test results | Comments |
| --- | --- | --- |
| 1 | pass | No color specks |
| 3 | pass | no color specks |
| 5 | pass | No color specks |
| 13 (comparative) | fail | significant color specks |
| 14 (comparative) | fail | significant color specks |
| 15 (comparative) | fail | significant color specks |

These results illustrate the benefits of the inventive complexes for coloration of polyolefins and shows the advantages of this invention in comparison to other similar coloring agents for such a purpose.

Polyurethane Foam Coloration Tests

Certain test examples were then introduced in situ as colorants within polyurethane foams. Samples from EXAMPLEs 1, 3, 5, and comparative EXAMPLEs 13, 14, and 15 were incorporated into polyurethane foams using the following composition:

COMPOSITION

| Component | Amount |
| --- | --- |
| Arcol ™ F3020 (Aroco) | 100.00 g |
| Water | 4.52 mL |
| Dabco ™ 33 LV (Air Products) | 0.15 mL |
| L-520 silicon (OSI Industries) | 1.50 mL |

-continued

COMPOSITION

| Component | Amount |
| --- | --- |
| T-10 catalyst (Air Products) | 0.32 mL |
| Toluene diisocyanate (Bayer) | 49.0 mL |
| Colorant Complex | 0.50 g |

Each foam sample was cured for 3 minutes at 160° C., allowed to cool, and then cut open. Each foam was examined for foam rise time, bun height, and color uniformity. Foams which show much lower bun height and much slower rise time than that of uncolored control and uneven color distribution were graded as fail. A pass grade was given to those foams which showed otherwise, with the results tabulated as follows:

TABLE 6

| Colorant Complex of Ex. # | Test results | Comments |
| --- | --- | --- |
| 1 | pass | good bun height, uniform color |
| 3 | pass | good bun height, uniform color |
| 5 | pass | good bun height, uniform color |
| 13 (Comparative) | fail | low bun height, bad color specks |
| 14 (Comparative) | fail | good bun height, bad color specks |
| 15 (Comparative) | fail | low bun height, bad color specks |

These results illustrate the benefits of the inventive complexes for coloration of polyurethane foams and shows the advantages of this invention in comparison to other similar coloring agents for such a purpose.

Ink Compositions and Applications

An ink jet composition comprising the inventive liquid salt-free complex was produced by first dissolving 10 parts of Acid Red 52 in 50 parts of water. 40 parts of Variquat™ K1215 was then added to this solution and the resultant mixture was stirred for 2 hours. To this mixture was added freshly prepared solution of 30% ammonium bicarbonate. The resultant composition was then placed in a separatory funnel and the aqueous layer was phase-separated out of the solution in order to effectively remove a large amount of inorganic salt. This procedure was repeated three times to lower the amount of sodium and chloride to less than about 100 ppm. The separated colorant complex was then stripped of excess water stripped to a level of below about 0.5% free water in the complex. Such a colorant may be introduced within ink jet formulations, as below, or within printing ink compositions.

EXAMPLE 19

10 parts of the inventive liquid complex as synthesized above were solubilized in 80 parts of water. 4 parts of N-methyl-2-pyrrolidinone, and 6 parts of diethylene glycol were then added to the solution in order to obtain an ink mixture. This ink mixture was then introduced into a Hewlett Packard™ deskjet W™ 682C to test for jettability of the colorant. A rectangular solid block (7 cm×9 cm) was printed on standard Bond paper sheets until the ink supply was depleted. There was no indication of any kogation or starvation of the inventive ink composition. Furthermore, the printability of the inventive colorant was excellent with no indications of missing dots or lines on the subject paper sheet.

EXAMPLE 20 (COMPARATIVE)

2 parts of commercially available Acid Red 52 were solubilized in 80 parts of water. 4 parts of N-methyl-2- pyrrolidinone and 14 parts of diethylene glycol were added to this solution in order to obtain an ink mixture. This ink mixture was then introduced within a Hewlett Packard™ deskjet™ 682C to test for jettability of the colorant. A rectangular solid block (7 cm ×9 cm) was printed on standard Bond paper sheets until the ink supply was depleted. After the first page there were indications of ink starvation as dots were missing and by the third page several lines were missing. Thus, the inks failed the requisite tests for ink jet applications as severe kogation and ink starvation was evident.

Aqueous Compositions

EXAMPLE 21

The colorant of EXAMPLE 1, above, was added in an amount of 0.1% by weight to a hard surface cleaner composition. The composition quickly became tinted light blue. After a period of storage, the colorant exhibited excellent lightfastness and thermal stability within such an aqueous-based composition.

While specific features of the invention have been described, it will be understood, of course, that the invention is not limited to any particular configuration or practice since modification may well be made and other embodiments of the principals of the invention will no doubt occur to those skilled in the art to which the invention pertains. Therefore, it is contemplated by the appended claims to cover any such modifications as incorporate the features of the invention within the true meaning, spirit, and scope of such claims.

What is claimed is:

1. A homogeneous colorant complex comprising an anionic dye compound;

and a quaternary ammonium compound;

wherein the colorant complex has been purified to substantially remove all salts other than the anionic dye/quaternary ammonium complex;

wherein the colorant complex absorbs color in the visible spectrum; and wherein the colorant complex is a liquid in its undiluted, pure state at ambient pressure and at a temperature below about 100° C.

2. The colorant complex of claim 1 wherein the quaternary ammonium compound is selected from the group consisting of trialkyl quats, dialkyl quats, dialkoxyalkyl quats, monoalkoxy quats, benzyl quats, imidazolinium quats, tetraalkyl quats, mono-substituted polyalkoxyalkyl quats, di-substituted polyalkoxyalkyl quats, and tri-substituted polyalkoxyalkyl quats, and any mixtures thereof.

3. The colorant complex of claim 2 wherein the quaternary ammonium compound is selected from the group consisting of methyl tri(hydrogenated tallow) ammonium chloride, dicoco dimethyl ammonium chloride, methyl bis(polyethoxyethanol)coco ammonium chloride, methyl(polypropylene glycol)diethyl ammonium chloride, dimethyl tallow benzyl ammonium chloride, methyl tallow amido-2-tallow imidazolinium methylsulfate, and any mixtures thereof.

4. The colorant complex of claim 2 wherein the anionic dye compound is selected from the group consisting of acid dyes, direct dyes, food dyes, and any mixtures thereof.

5. The colorant complex of claim 3 wherein the anionic dye compound is an acid dye.

6. The colorant complex of claim 1 wherein the complex is a liquid in its undiluted, pure state at ambient pressure and at a temperature below about 80° C.

7. The colorant complex of claim 6 wherein the complex is a liquid in its undiluted, pure state at ambient pressure at a temperature below about 65° C.

8. The colorant complex of claim 7 wherein the complex is a liquid in its undiluted, pure state at ambient pressure at a temperature below about 50° C.

9. An aqueous composition comprising the colorant complex of claim 1.

10. An organic formulation comprising the colorant complex of claim 1.

11. A colored thermoplastic composite comprising the colorant complex of claim 1.

12. The thermoplastic composite of claim 10 wherein said thermoplastic is selected from the group consisting of at least one polyolefin, at least one polyurethane, at least one polyester, and any mixtures thereof.

13. The thermoplastic composite of claim 11 wherein said thermoplastic is at least one polyolefin.

14. The thermoplastic composite of claim 12 wherein said polyolefin is selected from the group consisting of polypropylene, polyethylene, and any mixtures thereof.

15. A wax composition comprising the colorant complex of claim 1.

16. A printing ink composition comprising the colorant complex of claim 1.

17. A method of producing the liquid colorant complex of claim 1 comprising (a) reacting an anionic dye compound and a quaternary ammonium compound together in a reaction vessel; and (b) removing substantially all of the residual salt formed during the reaction in step "a".

18. The method of claim 14 wherein step "b" entails a filtration procedure.

19. The method of claim 14 wherein step "b" entails an extraction procedure.

20. The method of claim 14 wherein step "b" is a phase separation procedure.

* * * * *

UNITED STATES PATENT AND TRADEMARK OFFICE
CERTIFICATE OF CORRECTION

PATENT NO. : 5,948,152

DATED : September 7, 1999

INVENTOR(S) : Xiaodong Edward Zhao, Kaye Cannon Suddeth, Patrick D. Moore, Raj Batlaw It is certified that error appears in the above-identified patent and that said Letters Patent is hereby corrected as shown below:

Column 12, line 49, after the word "claim" delete ––14–– and insert ––17––.

Column 12, line 51, after the word "claim" delete ––14–– and insert ––17––.

Column 12, line 53, after the word "claim" delete ––14–– and insert ––17––.

Signed and Sealed this

Sixth Day of March, 2001

Attest:

NICHOLAS P. GODICI

Attesting Officer

Acting Director of the United States Patent and Trademark Office